L. C. PATTEE.

Circular Saw-Mills.

No. 5,303. Reissued March 4, 1873.

*Witnesses.*

Edward H. Osborne

Robert H. Manniers

*Inventor.*

Lewis C. Pattee

By R. H. Morgan

Atty

AM. PHOTO-LITHOGRAPHIC CO. N.Y. (OSBORNE'S PROCESS)

UNITED STATES PATENT OFFICE.

LEWIS C. PATTEE, OF LEBANON, NEW HAMPSHIRE.

IMPROVEMENT IN CIRCULAR-SAW MILLS.

Specification forming part of Letters Patent No. 121,466, dated December 5, 1871; reissue No. 5,303, dated March 4, 1873.

*To all whom it may concern:*

Be it known that I, LEWIS C. PATTEE, of Lebanon, in the county of Grafton and State of New Hampshire, have invented certain Improvements in Circular-Saw Mills, of which the following is a specification:

My invention relates to circular-saw mills in which the log is fed to the saw upon a traveling carriage; and my invention consists in certain novel combinations and arrangements of parts which have for their object to greatly facilitate the cutting of lumber.

Figure 1:
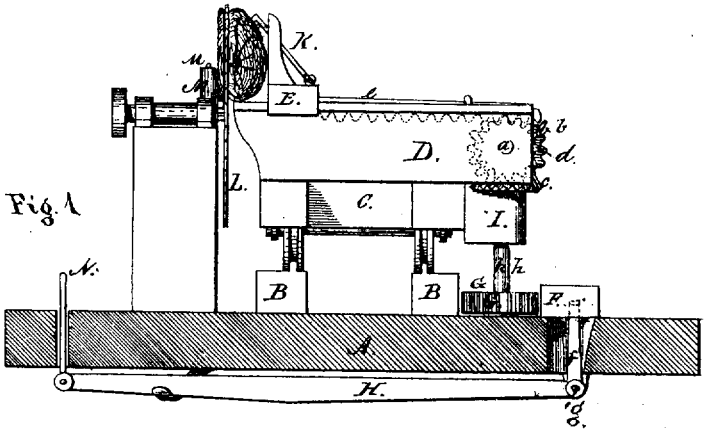
Figure 2:
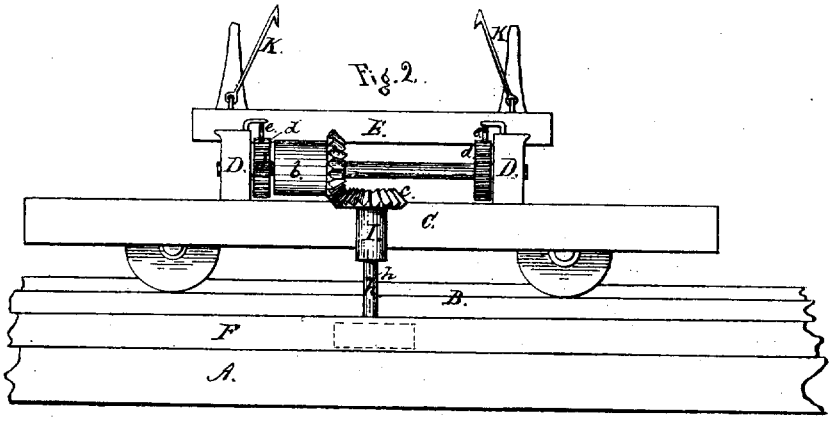

In the drawing, Figure 1 represents an end view of the carriage and mechanism, with the floor of the mill in sections to show the arrangements of certain parts beneath it. Fig. 2 is a side elevation.

A represents the bed or the flooring of the mill, and B B the track laid on it for the carriage C, which is supported and carried upon the flanged wheels. D D are the blocks upon which the log rests. They have a setting-block, E, which is moved back and forth by the racks *e e* secured to the block at one end, and gearing with and moved by the toothed wheels *d d* secured upon the horizontal shaft *a*, which has bearings in the ends of the stationary blocks D D of the carriage. F is a rail placed upon the floor A parallel with the track, and pivoted at one end to the floor, so that it may be moved toward and away from the rail nearest to it. This is accomplished by operating the lever H, pivoted at *g* beneath the floor, and moving the upright arm *f*, working in a recess in the rail F. The lever H is operated by the treadle N projecting through a hole in the floor. The horizontal shaft *a* has a bevel-gear secured upon it, whose teeth mesh with a like gear secured to the vertical shaft *h* held in the bracket I upon the carriage. The lower end of the vertical shaft is provided with a friction-wheel, G, and when the carriage is moved back and forth upon the track a rotary motion is given to it by pressing the movable rail F against this wheel with the lever H, and by it the bevel-gears *b c* will be operated to turn the wheels *d d*, which move the racks *e e*. This causes the setting-block E to be drawn away from the front of the carriage or moved up to it, according to the direction in which the carriage moves and the wheel G revolves. L represents the saw, and M a vertical gage-roller, adjustable by any ordinary means, and located a little in front or cut of the saw and on one side of the saw-line. The feed for moving the carriage back and forth may be the same as employed in ordinary circular-saw mills, and any detailed description is considered unnecessary here.

The operation of my improvement is as follows: The log is placed upon the carriage and held by the dogs K K, and its position determined for the slab by causing the wheel G to turn as the carriage is running forward, (which the operator effects by pressing upon the treadle N,) and moves the setting-block with its log toward the line of motion of the saw. By running the setting-block a short distance the log can be set in the required position for the first cut or slab. After the log is squared the vertical gage-roller M, which is adjustable toward and away from the saw, is set in the desired position from the saw to govern the thickness of the plank or board to be cut, and the log is then brought up against the roller for each cut. As soon as the log is brought up to the roller the rail F is released from contact with the friction-wheel G, and the motion of the gears is arrested. The setting of the log is thus made automatic, and placed under the control of the operator, thus greatly facilitating the operation of sawing by a great saving of time and labor.

Another feature of my invention—that of automatically turning the log—is accomplished as follows: The log resting upon the carriage-blocks D D and held by the dogs K K, which are secured to the setting-block E, can be drawn over as the setting-block is moved back on the carriage, and the use of cant-hooks and levers to turn the log will be materially dispensed with. Another advantage resulting from the use of my invention is that the log can be drawn away from the saw as soon as the cut is completed, so that the saw is out of contact with it when the carriage is moving back, and any vibration of the saw will not act to cut the log as it moves backward; and another advantage is that, after the log is sawed, the operator, by pressing his foot upon the treadle while the carriage is moving back, can move the setting-block back any distance required to receive another log.

I believe my invention to contain some of the most valuable contrivances ever made in circular-saw mills. I have thoroughly tested it, and find it works successfully; and my improved mode of setting the log will enable fully fifteen per cent. more lumber to be cut in a day by its use than can be done by any mill I have ever seen.

I am aware of the patent of Dennis Lane, dated June 30, 1868, for improvements in saw-mills; and I will here recite some of the differences between the invention of Lane and myself. In the invention patented to Lane the setting-blocks can only be automatically drawn away from the saw, and the log must be fed to the saw by hand, while in mine the log is automatically fed up to and away from the saw. In Lane's patent there is no gage-roller to arrest the movement of the log as it is moved up to the saw to determine the thickness of the stuff to be cut, and the operation of setting the log for cutting all kinds of stuff must be done by hand, while by my invention, for all dimensions of stuff, such as boards, planks, &c., from the thinnest to the thickest, the gage-roller, being adjusted to or from the saw the desired distance, will arrest the movement of the log as it is automatically fed forward, thereby dispensing with hand setting, which cannot be done by the use of the Lane invention, which is specially disclaimed.

Having thus fully described my invention, I claim—

1. The friction driving-roller G, movable rail F, actuated by treadle N through lever H, and arm *f*, in combination with the carriage C, set-blocks E, and intermediate means for setting the log to the saw, substantially as described.

2. The combination of the device above claimed with the adjustable gage-roller M, to determine the thickness of the stuff to be sawed, substantially in the manner shown and described.

3. The combination, in a circular-saw mill, of the frictional mechanism to set the log to the saw, the adjustable gage-roller to determine the thickness of the lumber to be sawed, with the circular saw, substantially in the manner described and shown.

LEWIS C. PATTEE.

Witnesses:
C. A. DURGIN,
H. M. PUTNEY.